March 6, 1951 H. H. KERR 2,544,387
TRUSS TYPE AIRCRAFT WHEEL
Filed June 3, 1946 5 Sheets-Sheet 1
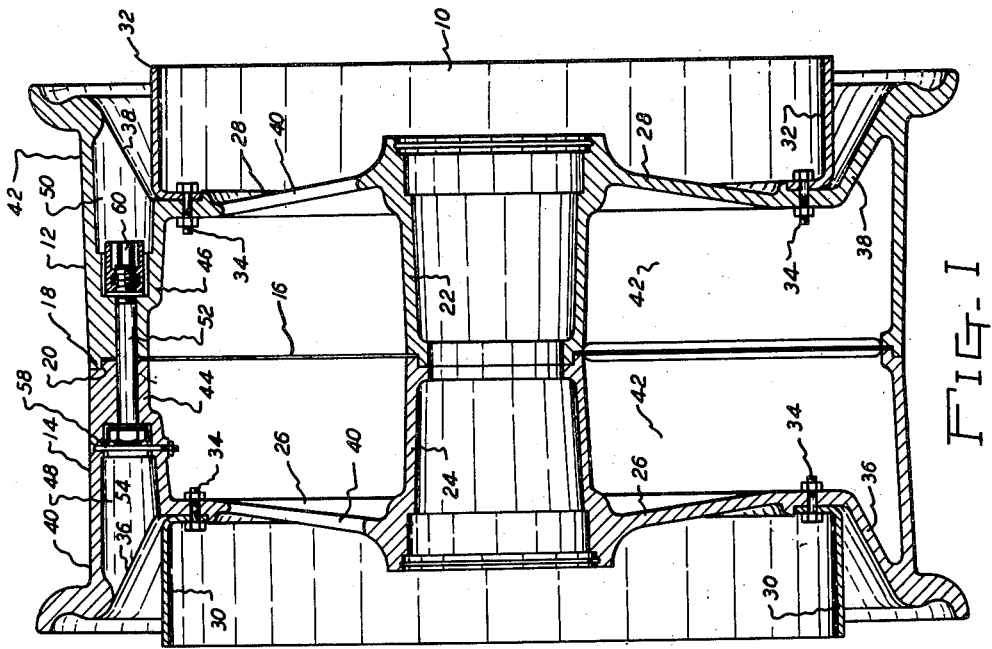
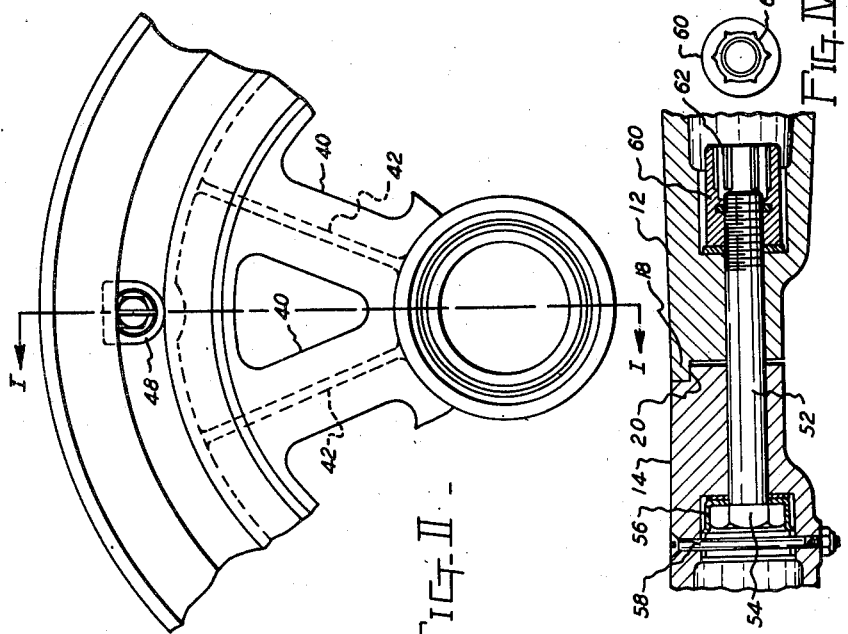
Inventor
HENRY H. KERR
By Beaman & Patch
Attorneys

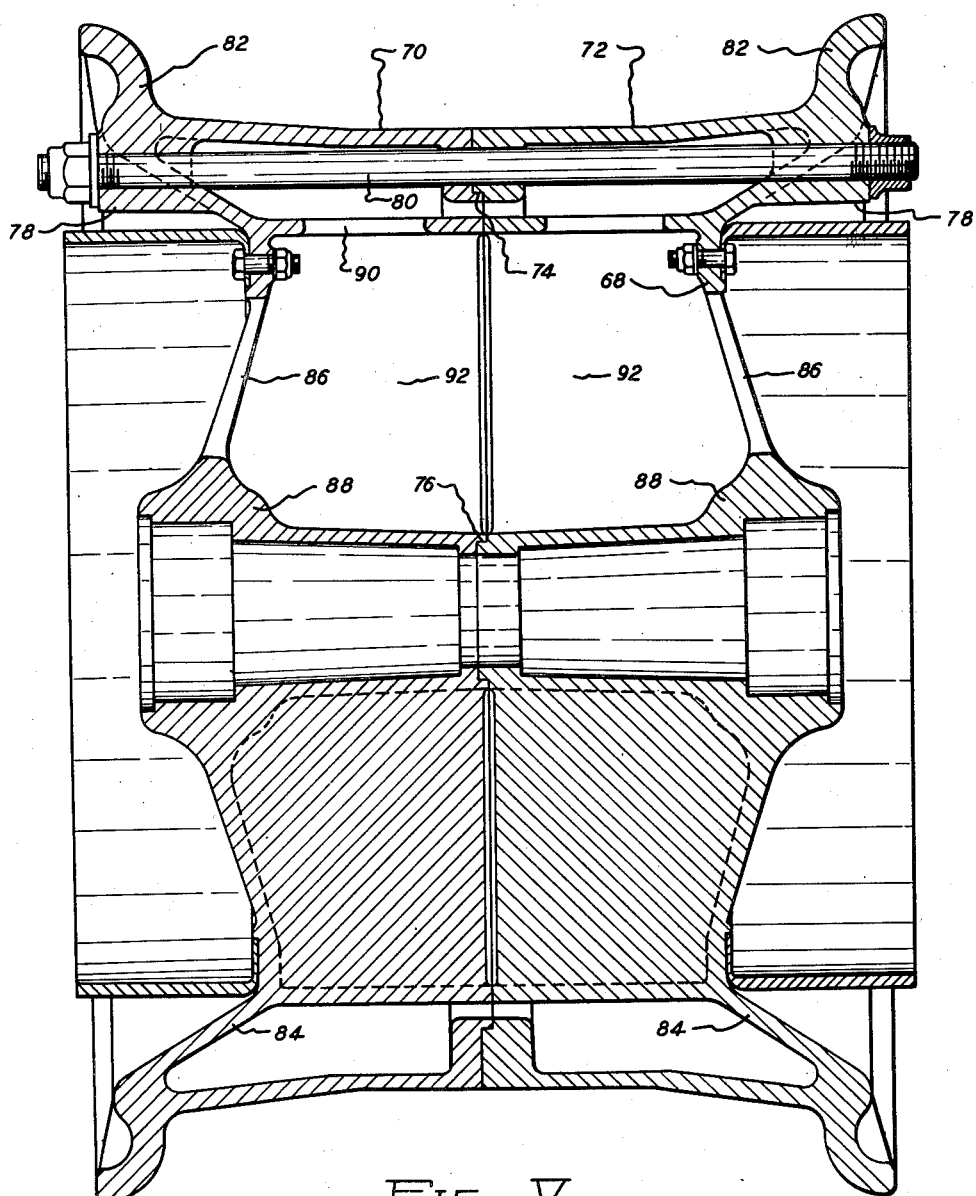
FIG_V
Inventor
HENRY H. KERR
By Beaman & Patch
Attorneys

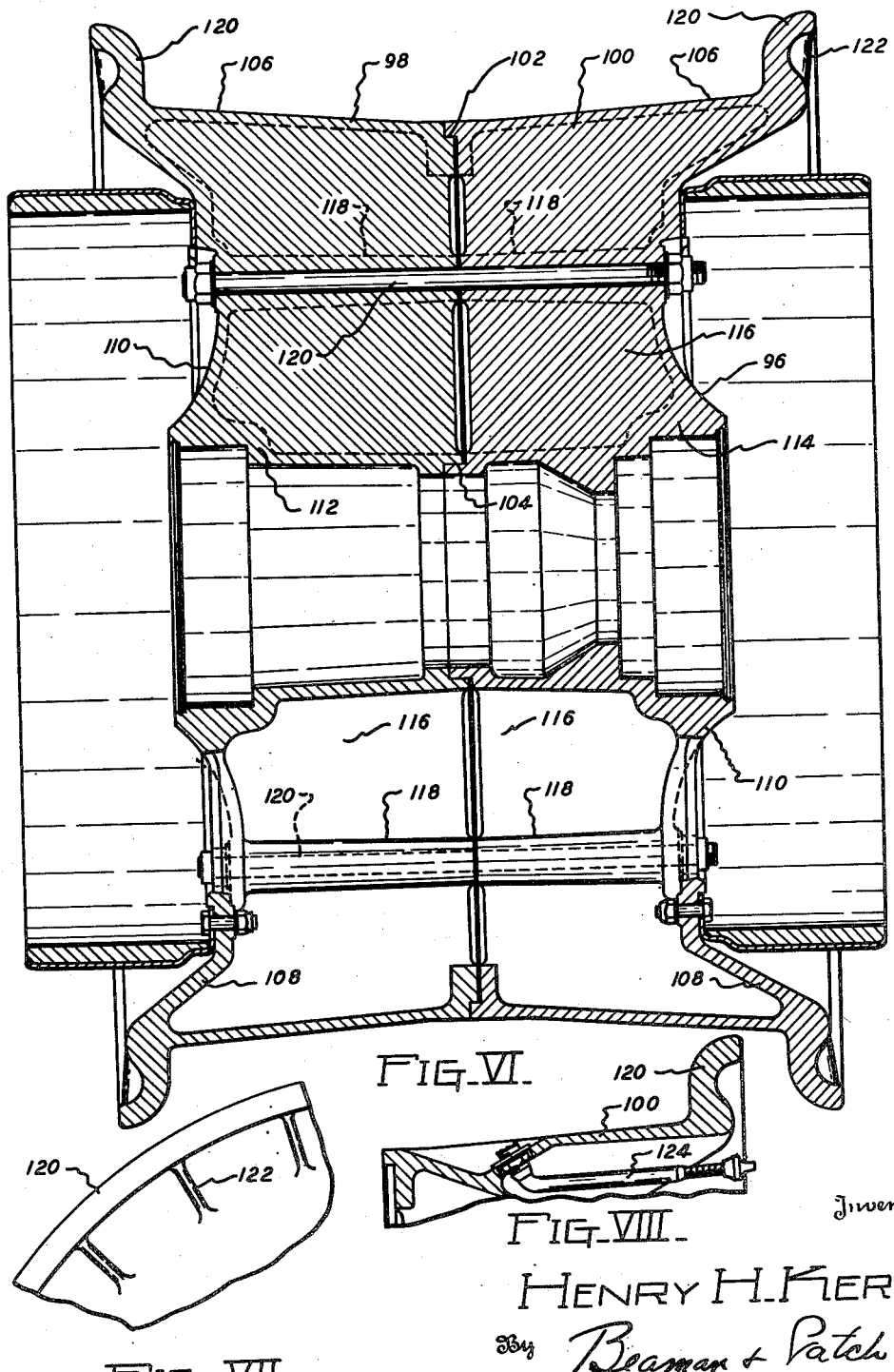

March 6, 1951          H. H. KERR          2,544,387
TRUSS TYPE AIRCRAFT WHEEL
Filed June 3, 1946          5 Sheets-Sheet 4
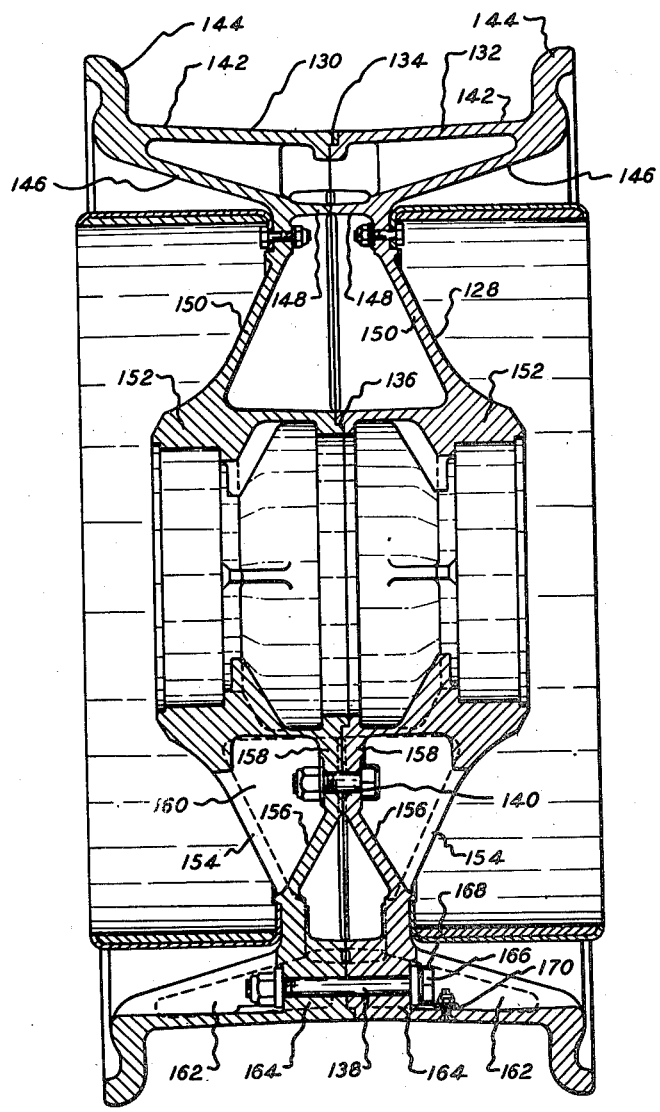
FIG. IX.
Inventor
HENRY H. KERR
By Beaman & Patch
Attorneys

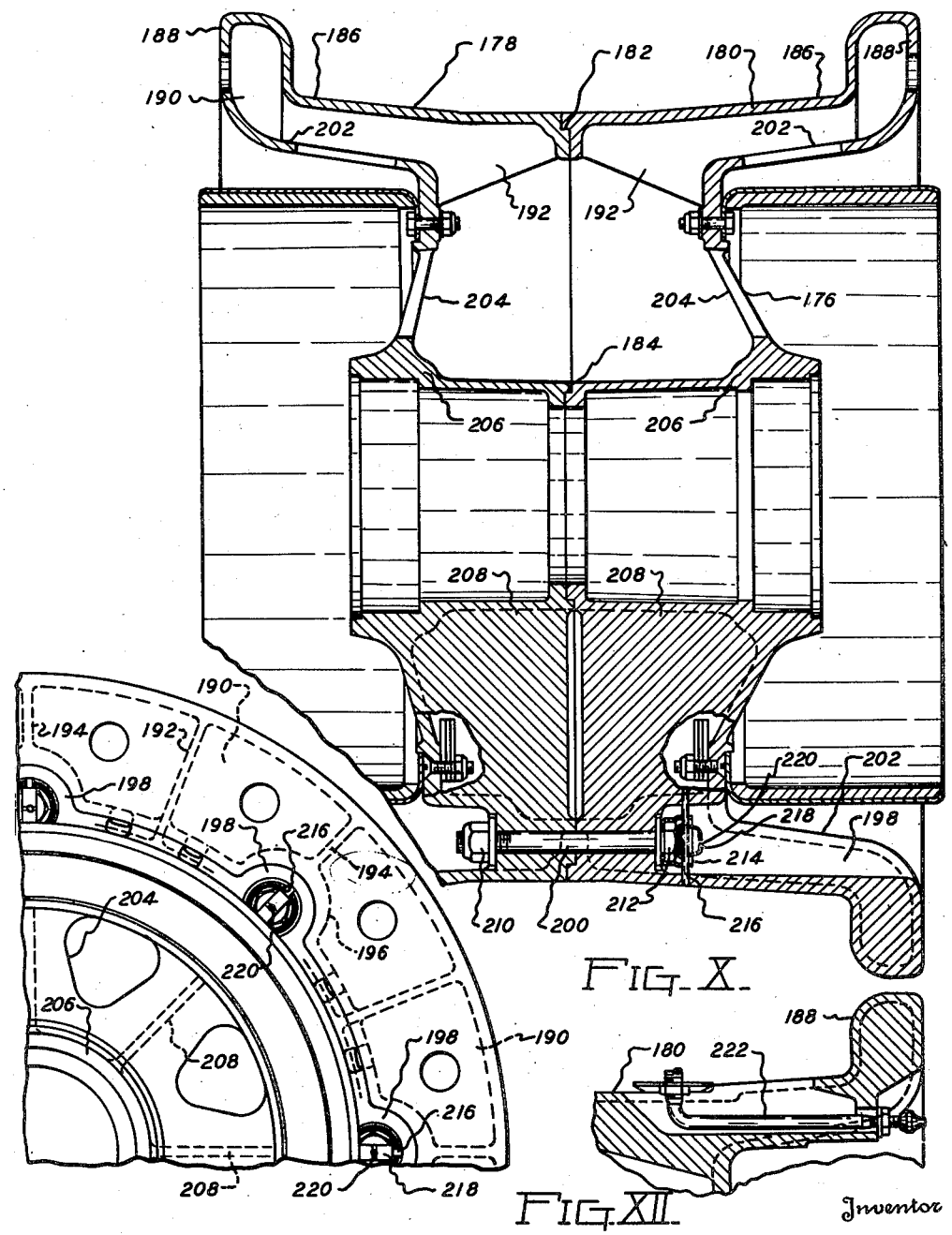

Patented Mar. 6, 1951

2,544,387

UNITED STATES PATENT OFFICE 2,544,387

TRUSS TYPE AIRCRAFT WHEEL

Henry H. Kerr, Jackson, Mich., assignor, by mesne assignments, to The B. F. Goodrich Company, Akron, Ohio, a corporation of New York Application June 3, 1946, Serial No. 674,095

5 Claims. (Cl. 301—65)

The present invention relates to improvements in wheel construction, being particularly concerned with giving greater support to the tire supporting rims of wheels which overhang the brake drum. Although the improved wheel design has a wide field of usefulness, it has been designed especially for aircraft.

According to the proposed design, the wheel is of a split cast construction with the radial load upon the tire rim of the wheel being transferred to the axle through a bridge-type truss. Burst forces from the tire are carried by tie bolts which hold the wheel parts assembled.

Thus, one of the objects of the invention is to provide an improved wheel of the type described having a truss construction for transferring the radial load to the axle.

Another object is to provide an improved truss-type wheel of a cast split type.

Another object is to provide a split wheel having an improved arrangement of tie bolts for carrying the burst forces of the tire.

These and other objects and advantages will be more fully treated hereinafter in connection with the detailed descriptions of the construction, combination and arrangement of parts.

In the drawings,

Fig. I is a vertical cross-sectional view taken from the center line I—I of Fig. II, Fig. II is a fragmentary end view of the wheel structure, Fig. III is an enlarged view of the tie bolt assembly, Fig. IV is an end view of the tie bolt shown in Fig. III, Fig. V is a view similar to Fig. I of a modified form of the invention, using a different form of tie bolt, Fig. VI is a view similar to Fig. I of a still further modification of the invention, Fig. VII is a fragmentary end view of the wheel structure shown in Fig. VI illustrating the radial reinforcing ribs, Fig. VIII is a fragmentary sectional view of the wheel shown in Fig. VI illustrating the valve stem arrangement, Fig. IX is a view similar to Fig. I of a still further modification of the invention, Fig. X is a view similar to Fig. I of another modification of the invention, Fig. XI is a fragmentary end view of the wheel structure shown in Fig. X, and Fig. XII is a fragmentary radial section illustrating the valve stem arrangement.

Referring to the form of the invention illustrated in Figs. I to IV, inclusive, the wheel 10 comprises two cast portions 12 and 14 meeting along the line 16, one of the parts being provided with an annular flange 18 piloted upon an annular shoulder 20. Hub parts 22 and 24 having slightly conical web portions 26 and 28 carry brake drums 30 and 32 which are attached by bolts 34 adjacent the point of merger between the conical web portions 26 and 28 and the conical portions 36 and 38 which support the tire rim portions 40 and 42 overhanging the brake drums 30 and 32.

As more clearly shown in Fig. II, the webs 26 and 28 have openings 40 separated by radial ribs 42. Between each rib 42 of the parts 12 and 14 are bosses 44 and 46, respectively. These bosses are preferably recessed at 48 and 50 to receive relatively short tie bolts 52. Referring to Fig. III, the hexagon head 54 of the bolt 52 is held against rotation by a stamping 56 in the form of a hexagon socket. A bolt 58 holds the stamping 56 in position and against rotation. A socket head nut 60 is threaded upon the bolt 52 and drawn up by a suitable socket wrench operating in the hexagon recess 62 to hold the parts 12 and 14 assembled as shown in Fig. I.

The truss construction of the wheel above described comprises the rims 40 and 42, the conical portions 36 and 38 and the boss portions 44 and 46. It is this truss combination that transfers the radial load to the axle through the conical webs 26 and 28. The tie bolts 52 take the burst forces from the pneumatic tire mounted on the rim. By locating the bolts 52 in the recesses 48 and 50 of the bosses 44 and 46, a relatively short bolt may be employed.

In the modification shown in Fig. V, the wheel structure 68 comprises two similar cast portions 70 and 72 piloted upon complementary flange portions 74 and 76. Circumferentially of the wheel 68 are bosses 78 through which the tie bolts 80 extend to hold the parts 70 and 72 assembled and take the burst load of the tire. The tire supporting rim portions 82 are supported by conical portions 84 which extend entirely around the wheel structure being interrupted only by the bosses 78. Merging with the conical members 84 are conical spoke sections 86 which transfer the radial load to the hub portions 88 of the wheel. Cylindrical compression portions 90 give support to the conical portions 84 while the tension loads are carried by the tie bolt 80. Thus, in the bridge-type truss just described, the burst forces from the tire are carried through the tie bolts 80 while the radial load forces are carried by the conical portion 84 and the compression members 90. The unbalanced load upon the wheel due to side loads are carried by the radial webs 92 which are located simi'arly to the webs 42 of the modification shown in Fig. II. In the construction illustrated, the webs 92 have been carried into the truss section by being an integral part of the compression members 90.

In the modified form of the invention shown in Figs. VI to VIII, inclusive, the wheel 96 comprises similar cast portions 98 and 100, piloted upon complementary flange portions 102 and 104. The rim portions 106 are supported by conical portions 108 which merge with slightly conical portions 110 to transfer the radial loads to the hub portions 112 and 114. The side loads upon the wheel are taken through radial web portions 116 provided with boss portions 118 through which the tie bolts 120 extend to hold the wheel sections 98 and 100 assembled to take in tension the burst forces from the pneumatic tire.

As more clearly shown in Fig. VII, the tire retaining flanges 120 are supported by radial webs 122. In Fig. VIII the manner in which the wheel section 100 is cast to accommodate the valve stem 124 is illustrated.

In the modifications shown in Fig. IX, the principles of construction shown in Fig. V have been adapted to enable the employment of a relatively short tie bolt. As illustrated, the wheel 128 comprises similar cast sections 130 and 132 piloted upon complementary flange portions 134 and 136 and held together by tie bolts 138 and 140. The rim portions 142 have tire retaining portions 144, with the radial load supported by the conical portion 146 and the cylindrical compression portion 148. The conical portions 150 transfer the radial load to the hub portions 152.

The conical portions 150 are interrupted throughout the circumference by openings 154 defined in part by conical wall portions 156 merging with the radial wall portions 158 through which the tie bolts 140 extend. The side loads upon the wheel are taken by the radial web portions 160.

The conical portions 160 are interrupted to provide recesses 162 to permit the use of relatively short tie bolts 138 extending through the boss portions 164. The head 166 of each tie bolt 138 is shown held against rotation in a similarly shaped stamped socket 168 held against rotation by a bolt 170.

In the remaining modified form of the invention illustrated in Figs. X to XII, inclusive, the wheel 176 comprises similar cast parts 178 and 180 piloted upon flange portions 182 and 184. The rim portions 186 have tire retaining flanges 188, the rim and flanges being made up of a series of cast pockets 190 separated by full wall portions 192 and lesser wall portions 194 the latter merging with the thickened wall structure 196 defining the externally opening recesses 198 in which the relatively short tie bolts 200 are assembled to hold the wheel parts 178 and 180 together to take the burst load of the tire under tension.

The slightly conical wall structure 202 merges with the conical spoke structure 204 which transfers the radial load to the hub portions 206 of the wheel structure. Side load and unbalanced forces are taken through the radial web portions 208.

The tie bolt 200 is threaded at one end to receive a nut 210. The head 212 is received in a cup-shaped stamping 214 shaped to receive the head 212 and prevent relative rotation of the head 212 and the cup-shaped portion 214. Aligned openings are provided in the cup 214 as well as in the wheel part 180 to receive a removable pin 216 which holds the cup member 214 against rotation. To prevent inadvertent removal of the pin 216, a double biased spring metal detent 218 is provided with openings through which the pin 216 passes with slight clearance. A slot 220 to receive a screwdriver is provided for opening up the detent 218 to relieve the biasing action and bite upon the pin 216 so the latter can be removed as desired. In Fig. XII the construction of the wheel parts 180 to accommodate the valve stem 222 is illustrated.

From the several different forms of the invention illustrated, it should be readily apparent that the principles of construction involved may take many forms and for that reason it is not my intention to limit my invention to the precise forms illustrated but to include within its scope all structures embodying the said principles of construction and embraced within the following claims.

Having thus described my invention, what I claim as new and desire to cover by Letters Patent is:

1. A radially split two-piece wheel structure for pneumatic tires comprising a pair of parts piloted upon each other adjacent the radial plane along which the wheel is split, hub portions, rim portions including tire retaining flanges overhanging said hub portions, said hub and rim portions being integral with their respective said parts and having interfitting annular flanges and recesses piloting the wheel parts upon each other, integral conical like wall structure extending from said flanges inwardly and toward said plane, conical wall structure extending from said hub portions outwardly and merging with said first conical wall structure, said first and second wall structures transferring the radial load from said rim portions to said hub portions, abutting wall structure transversely disposed to said plane and located adjacent the point of merger of said first and second wall structures for taking compression loads, tension members transversely disposed to said plane and located directly adjacent said rim portions and radially outward from said point of merger to take the burst load of the pneumatic tire and to hold said parts assembled, and radially disposed transversely extending wall structure extending between said plane and said second conical wall structure and between said abutting wall structure members and said hub portions to take the side and unbalanced load structure of the wheel.

2. A wheel structure as defined in claim 1 wherein circumferentially spaced inwardly extending pockets are provided in said conical structure to receive said transverse tension members.

3. A wheel structure as defined in claim 1 wherein said transverse tension members are housed within one of said transversely extending wall structures.

4. A wheel structure as defined in claim 1 wherein said first and second transversely extending wall structures are located in the same axial plane.

5. A wheel structure as defined in claim 1 wherein said first and second transverse extending wall structures are located in the same axial plane and said tension members are housed in one of said wall structures.

HENRY H. KERR.

REFERENCES CITED

The following references are of record in the file of this patent:

UNITED STATES PATENTS

| Number | Name | Date |
|---|---|---|
| 1,522,259 | Odenkirk | Jan. 6, 1925 |
| 1,610,023 | Meldrum | Dec. 7, 1926 |
| 2,105,317 | Frank | Jan. 11, 1938 |
| 2,124,773 | Frank | July 26, 1938 |
| 2,272,962 | Tatter et al. | Feb. 10, 1942 |

FOREIGN PATENTS

| Number | Country | Date |
|---|---|---|
| 499,560 | Germany | Mar. 11, 1928 |